F. E. BRIGHT.
CAGE FOR ANTIFRICTION BEARINGS.
APPLICATION FILED JULY 22, 1914.
1,221,020. Patented Apr. 3, 1917.
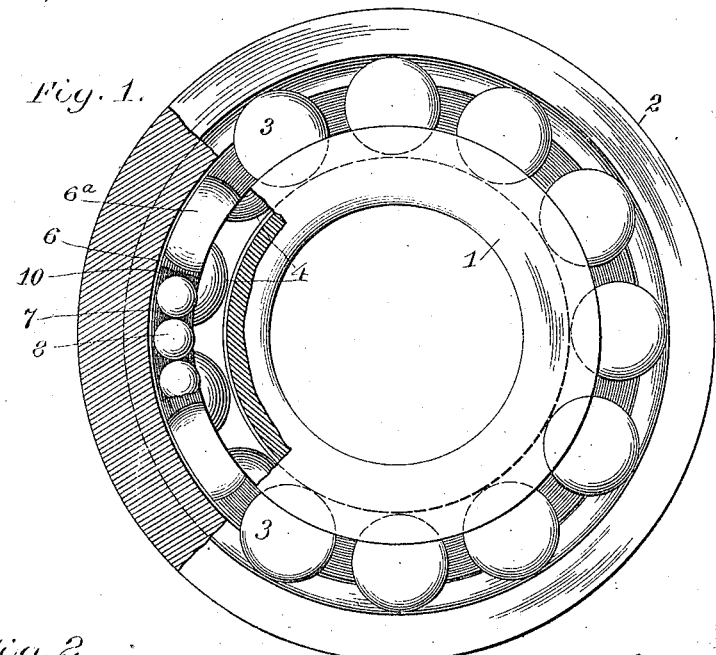
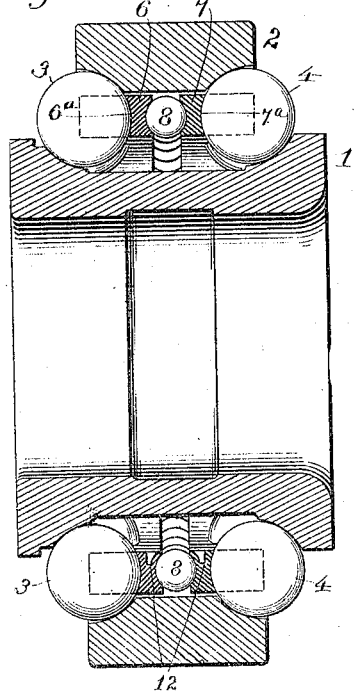
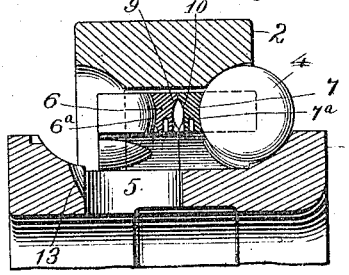
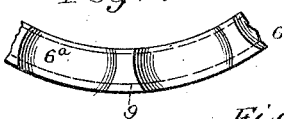
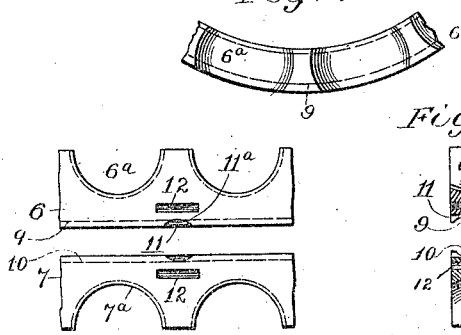

UNITED STATES PATENT OFFICE.

FRED E. BRIGHT, OF PHILADELPHIA, PENNSYLVANIA, ASSIGNOR TO THE HESS-BRIGHT MANUFACTURING COMPANY, A CORPORATION OF DELAWARE.

CAGE FOR ANTIFRICTION-BEARINGS.

1,221,020.   Specification of Letters Patent.   Patented Apr. 3, 1917.

Application filed July 22, 1914.   Serial No. 852,343.

*To all whom it may concern:*

Be it known that I, FRED E. BRIGHT, a citizen of the United States, residing at Philadelphia, in the county of Philadelphia and State of Pennsylvania, have invented certain new and useful Improvements in Cages for Antifriction-Bearings, of which the following is a specification, reference being had therein to the accompanying drawing.
This invention relates to antifriction bearings and has reference more particularly to the spacing device or cage which is usually employed in the bearings to maintain the rolling elements in spaced relations so as to avoid grinding or friction between them.

The invention has special reference to a cage for use in what are known in the art as double row bearings, that is, bearings having two series of rolling elements between the casing members, between which series the loads to which the bearing is subjected are distributed.

The aim of the invention is to produce a cage for bearings of this type which will admit of a circumferential movement of one series of rolling elements relatively to the other in the operation of the bearing, to the end that the said series may independently adjust themselves to the varying conditions encountered, so that any tendency of variation of movement of the two series, due to inaccuracy in, or wear between the parts, will not cause binding or twisting strains, or sliding friction.
With these ends in view, my improved cage comprises two annular members formed to space the rolling elements of the bearing, said members having operative engagement with each other, and being movable circumferentially relatively of each other.

The invention consists also in providing for an operative engagement of the two members with each other by means of rolling antifriction devices mounted in a raceway between said members, the said raceway being preferably formed by grooves in the adjacent edges of said members, into which the rolling antifriction devices are introduced preferably through a filling opening or notch formed in the walls of the grooves.

The invention consists also in so forming the notches constituting said filling opening, that the walls of the same may be displaced to contract the opening to prevent the acci-
dental escape of the rolling antifriction devices from the raceway.

In the accompanying drawings:

Figure 1 is a side elevation of an antifriction bearing equipped with my improved cage, certain parts being broken away to expose other parts to view.

Fig. 2 is a central longitudinal section through the same.

Fig. 3 is a similar section through one side of the bearing and cage, showing how the parts are assembled.

Fig. 4 is an elevation of a portion of the members of the cage, showing the filling opening for the introduction of the antifriction devices in the raceway between said members.

Fig. 5 is a cross section of the same taken through the filling opening for the antifriction devices.

Fig. 6 is an edge view of a portion of one of the cage-members, showing the pockets therein for holding the rolling elements.

Referring to the drawings:

I have shown my improved cage applied to an antifriction bearing comprising inner and outer casing members 1 and 2 formed with two raceways between them, in which are mounted two series of load carrying rolling elements 3 and 4, in the present instance in the form of antifriction balls, the inner casing member being provided with a filling opening 5 extending radially therethrough between the raceways, and the ball tracks on said raceways being continuous and uninterrupted throughout their extent. It is manifest however that the invention is applicable to other forms of antifriction bearings, that shown being merely one by way of example.

My improved cage comprises two annular ring-like members 6 and 7, which are provided in their outer edges with sockets or pockets 6ᵃ and 7ᵃ respectively, for the rolling elements, so that when the two members are assembled in operative relation in the bearing, side by side between the two series of balls, the latter will be received in the pockets, and the individual balls of the two series will be spaced apart circumferentially, while the two series of balls will be spaced apart axially. The inner edges of the annular members have operative engagement with each other in order to effect the axial spacing of the two series, through the medium of spacing devices in the form of small antifriction balls 8, which are mounted in a raceway between the annular members formed by opposing grooves 9 and 10 in the adjacent edges of the respective members. The balls 8 act to prevent friction between the members of the cage, which are adapted in the action of the bearing, to move circumferentially relatively to each other, and the balls also serve to maintain the two series of load carrying balls 3 and 4 spaced apart in an axial direction, and in effect the balls 8 thus form an operative connection between the two members of the cage. The introduction of the balls 8 into their raceway, is effected through a filling opening 11 (see Fig. 4) which opening is formed by semicircular notches 11a cut in the inner overhanging walls of the grooves, which notches when adjusted opposite to each other as shown in Fig. 4, will conjointly form a circular opening through which the balls may be introduced into their raceway. The balls are prevented from escaping after being inserted in place, by contracting the filling opening, which may be effected by swaging or displacing the walls of the same inwardly toward each other, as shown in Fig. 5. To permit the material to be thus displaced, recesses 12 are formed in the inner surfaces of the cage-members just back of and in proximity to the notches, and by the insertion of a suitable tool in the recesses, the intervening material may be forced or bent inwardly and caused to close up the gap or notch in the overhanging portion of the grooves.

In the particular bearing illustrated, the tracks or ways on which the balls travel in their respective raceways, are continuous and uninterrupted throughout their extent, one of the series of balls 4 being adapted to be assembled in its raceway, by axially displacing the casing members of the bearing, and the other series of balls 3 being adapted to be assembled in its raceway by forcing the balls in succession through the filling opening 5 before alluded to, which filling opening is cut away at one side as at 13 to permit the balls to pass, which cut away portion terminates inward of the effective track on the inner casing member and does not therefore interrupt the same. In the application of my improved form of cage to a bearing of this particular type, use is made of the filling opening 5 in introducing the antifriction spacing balls 8 into their raceway between the cage-members, the assemblage of the parts being effected in the following manner: The series of balls 4 is assembled in its raceway by first axially displacing the inner and outer casing members relatively to permit the balls to be seated on the track on the inner casing member, whereupon on restoring the casing members to their proper operative position, the balls 4 will be seated in operative position in their raceway. The two annular members of the cage are next slipped over the inner casing member, and the pockets of the cage member 7 are seated around the balls 4, and the two members are moved close together and will occupy the position shown in Fig. 3. The other series of balls 3 are now introduced in succession through the radial filling opening in the inner casing member, and are passed into and seated in their raceway, the distance between the inner edge of the cage-member 6 and the edge of the cut-away portion 13 of the casing member, being sufficient to permit the balls to be passed by the exercise of moderate force. The member 6 of the cage is now moved axially outward from the other member, by which action the pockets 6a therein will be caused to seat around the balls 3, and the cage-members are then adjusted around circumferentially to bring the notches 12 therein in opposition, and to bring the filling opening 10 thus formed, in register with the filling opening 5 in the inner casing member. The spacing balls 8 are now introduced in succession through the filling opening 5 and the filling opening 10 in the cage-members, and are distributed throughout the raceway between the cage-members, and when the required number has been thus introduced, the filling opening 10 is contracted by swaging or displacing the material, adjacent the notches, inwardly as described. As a result of the construction described, the balls of the two series are effectually spaced apart individually in a circumferential direction by the cage-members, and the two series of balls are held apart and any possibility or liability of accidental displacement from their raceway is prevented. At the same time one series of balls is free to adjust itself in a circumferential direction relatively to the other series of balls and independently thereof, the relative movement between the two members of the cage permitting this action. As a result any tendency of one series of balls to move either faster or slower in the action of the bearing than the other series, which might arise by reason of inaccuracy in the grinding of the ball tracks, or in the diameter of the balls, or uneven load pressures on the respective balls or series, will not impose any binding or other strains on the other series of balls, and any liability of sliding friction or other objectionable operation of an analogous nature, will be effectually eliminated.

With the parts assembled as shown and described, a unit-handling bearing is produced in which the parts are held together without the use of extraneous fastening devices, and in which the ball tracks are uninterrupted and continuous throughout their extent, and in which the friction between all the moving parts is reduced to a minimum or practically eliminated.

While the application of my improved cage to a bearing of the particular type set forth possesses advantages in the respects and particulars pointed out, it is manifest that the cage is applicable to other forms of bearings, more particularly of the two-row type, and it is to be understood therefore that the invention is not limited to any particular form or construction of the parts, or in its use in connection with any particular form of bearing, except in so far as such limitations are specified in the claims.

Having thus described my invention, what I claim is:

1. In combination with an antifriction bearing consisting of inner and outer casing members and two series of interposed rolling elements, a cage for said bearing comprising two cage members arranged between the said rolling elements and adapted to space the same, and movable relatively to each other circumferentially, and antifriction devices between and engaging said cage members to maintain them in axially spaced relations.

2. In combination with an antifriction bearing consisting of inner and outer casing members and two series of interposed rolling elements, a cage for said bearing comprising two cage members arranged between the two series of rolling elements, and movable relatively to each other circumferentially, and antifriction balls between said cage members to maintain them in axially spaced relations.

3. In combination with an antifriction bearing consisting of inner and outer casing members and two series of interposed rolling elements, a cage for said bearing comprising two cage members arranged between said rolling elements, and movable circumferentially relatively to each other and provided with pockets to receive the rolling elements, the adjacent edges of the said cage members being grooved circumferentially, and spacing devices mounted in said grooves to maintain the cage members in axially spaced relations.

4. In combination with an antifriction bearing consisting of inner and outer casing members and two series of interposed rolling elements, a cage for said bearing comprising two annular members arranged between said rolling elements and movable circumferentially relatively to each other and formed to space the rolling elements, said cage members having a grooved raceway between them provided with a filling opening, and antifriction spacing devices adapted to be entered through the filling opening into said raceway and acting to maintain said cage members in axially spaced relations.

5. In combination with inner and outer casing members formed with two raceways, two series of rolling elements in said raceways, one of said casing members being provided with a filling opening situated between the raceways, a cage for said rolling elements comprising two annular members situated between the two series of rolling elements and movable circumferentially relatively to each other, and spacing devices between said members adapted to be introduced through said filling opening to maintain said members in axially spaced relations.

6. In combination with inner and outer casing members formed with two raceways for two series of rolling elements, and the inner member being provided with a filling opening situated between the raceways, a cage for said rolling elements, comprising two annular members movable circumferentially relatively to each other and formed to space the rolling elements, said members being formed at their inner sides to constitute a raceway between them, and said raceway having a filling opening and a series of rolling spacing devices adapted to be introduced into the raceway between the cage-members through the filling opening in the inner casing member of the bearing, and through said filling opening in the cage-members to maintain said members in axially spaced relations.

In testimony whereof, I have affixed my signature in presence of two witnesses.

FRED E. BRIGHT.

Witnesses:
  C. S. BUTLER,
  THEO. H. MCCALLA.